F. WEED.

Shoes.

No. 5,872. Reissued May 12, 1874.

Witnesses
Samℓ M. Barton
Geo H. Long

Inventor
Fitch Weed
by his atty -
Lewis D. Wright -

AM. PHOTO-LITHOGRAPHIC Co. N.Y. (OSBORNE'S PROCESS.)

UNITED STATES PATENT OFFICE.

FITCH WEED, OF NEW BEDFORD, ASSIGNOR, BY MESNE ASSIGNMENTS, TO JOHN S. FOLSOM, OF BOSTON, MASSACHUSETTS.

IMPROVEMENT IN SHOES.

pecification forming part of Letters Patent No. 50,057, dated September 19, 1865; reissue No. 5,872, dated May 12, 1874; application filed February 11, 1874.

*To all whom it may concern:*

Be it known that I, FITCH WEED, of New Bedford, in the county of Bristol and State of Massachusetts, have invented certain new and useful Improvements in Shoes; and I do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 1:
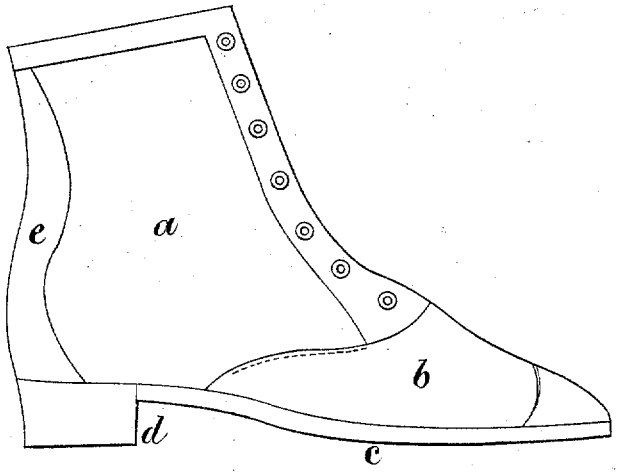
Figure 2:
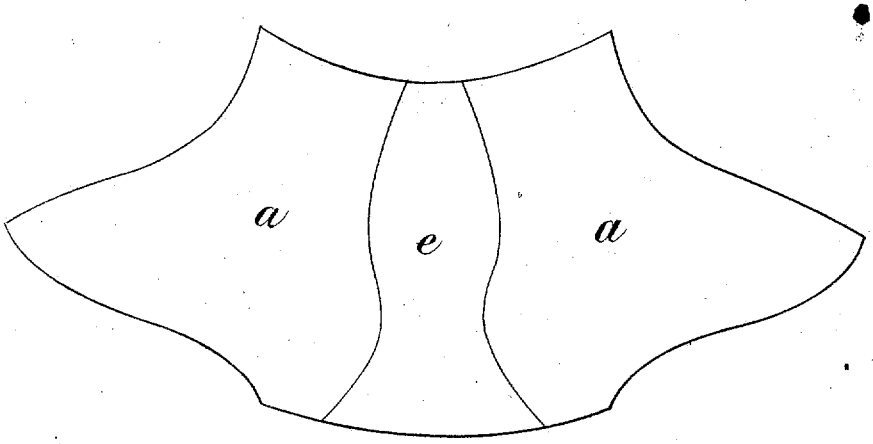

Figure 1 is a side view of a shoe provided with my improvement, and showing a crimped back. Fig. 2 is a representation of the quarter, and the back piece in a distended state.

The nature of my invention or improvement consists in constructing a boot or shoe with a back piece, crimped or otherwise, connecting the two quarters, and running down the back, and from the top to the bottom of the upper, the object of such invention being not only to obtain a better fit of the upper to the heel and ankle of the wearer of the shoe, but to avoid the usual back seam, which imparts a disagreeable stiffness to the upper, and frequently operates to chafe the foot or wear the stocking.

In the drawings, *a a* denote the quarters, *b* the vamp, *c* the sole, and *d* the heel of the sole, of an ordinary shoe or bootee.

In carrying out my invention, I connect the two quarters *a a* with a whole back piece, *e*, crimped or otherwise formed, essentially in manner as exhibited in the figures, each quarter not being sewed to the other, but to the back piece, which thus comes directly between the two quarters. The middle of the said piece *e* runs down the back of the heel part of the upper. As the seams are brought on the sides of the ankle and heel part of the upper, they do not injuriously interfere with the proper flexibility of the upper. The back piece, while enabling the workman to obtain a better form for the shoe, is effective in saving stock, and beneficial in various other respects.

I am aware that shoes have been made with their uppers brought together and sewed at their edges, so as to form a seam down the back of the heel and ankle parts of the upper, and that such seam has had a strip of leather laid on it and sewed to both conjoined portions of the upper. I do not claim such, as it differs wholly from my invention; as, in carrying out the latter, the two portions or quarters of the upper are not lapped on one another and sewed together, so as to form a seam running down the back of the heel, but they are arranged apart, and are only connected by the back piece arranged between them and sewed to each; therefore,

What I claim as my invention or improved manufacture is—

1. A shoe as made with a crimped back piece, *e*, inserted between and sewed to each of the quarters *a a* of the upper, and running from the top down to the heel of the sole, substantially as hereinbefore specified.

2. In a boot or shoe, a whole seamless back, crimped with an ogee curve, to conform to the heel and lower part of the leg, substantially as described.

In testimony that I claim the foregoing I have hereunto set my hand.

FITCH WEED.

Witnesses:
CARROLL D. WRIGHT,
SAML. M. BARTON.